Nov. 21, 1961   L. G. SYMONS ET AL   3,009,660
RELEASE AND ADJUSTMENT FOR GYRATORY CRUSHERS
Filed Sept. 8, 1958   5 Sheets-Sheet 3

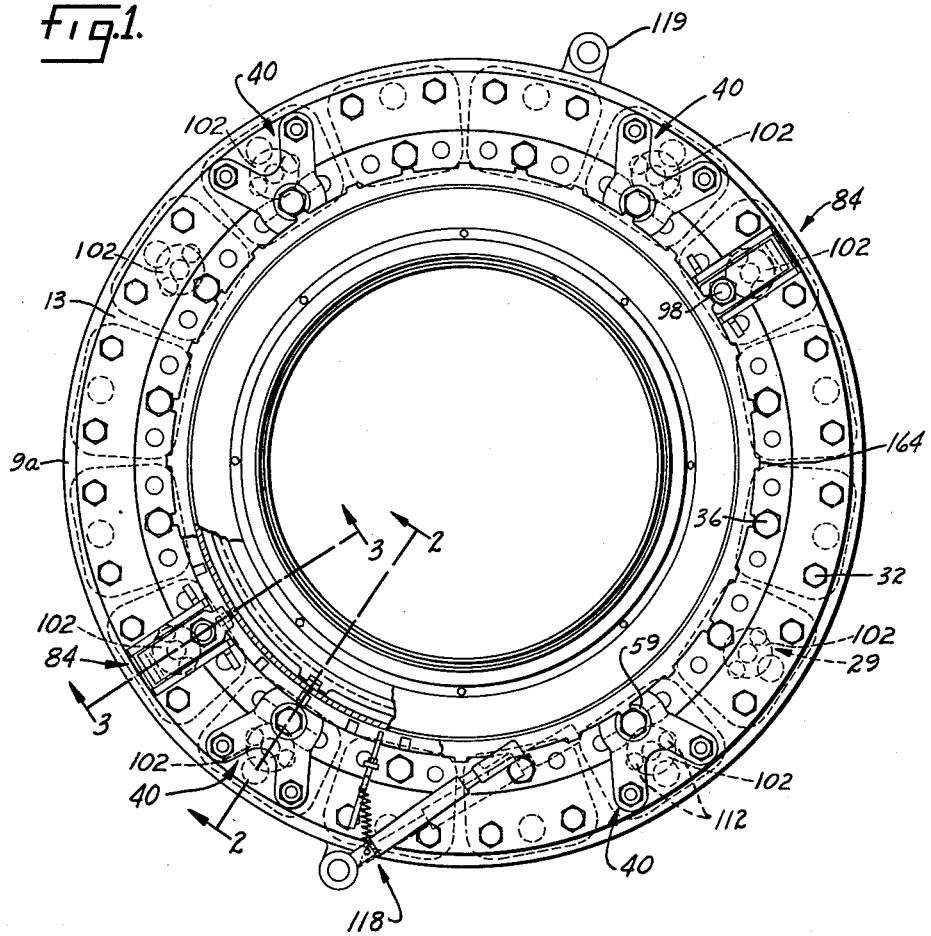
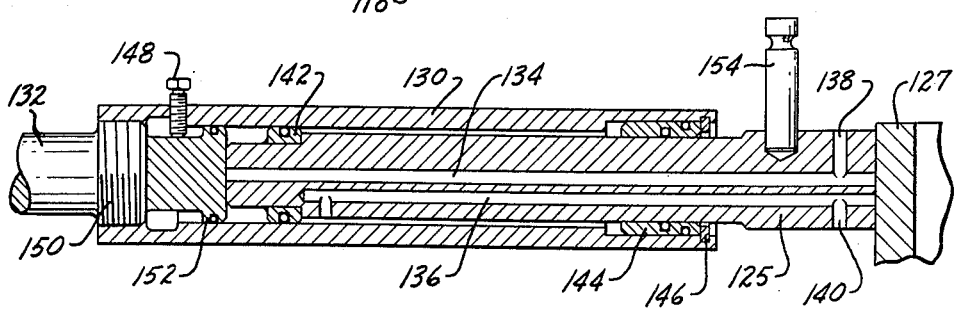

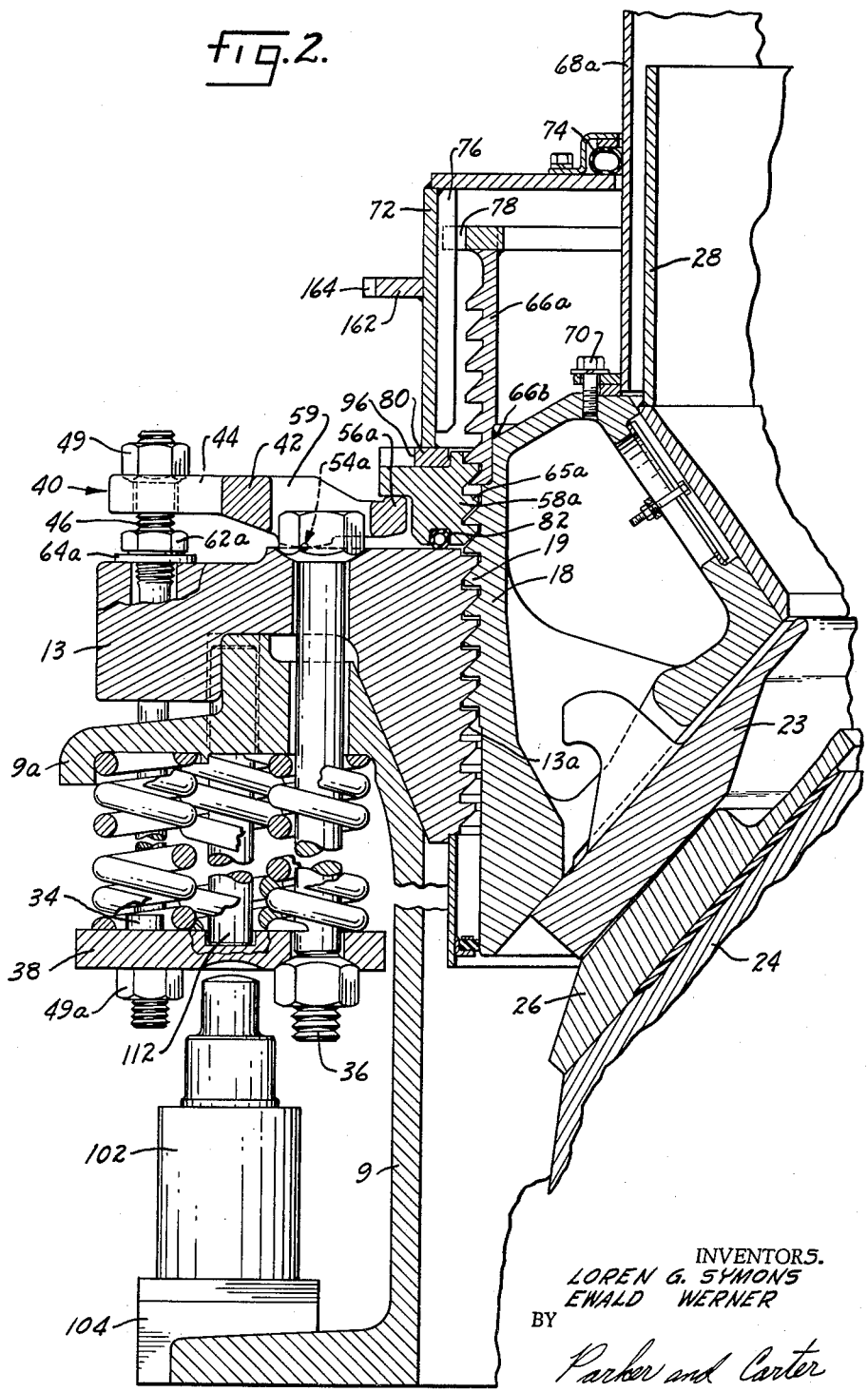

INVENTORS.
LOREN G. SYMONS
EWALD WERNER
BY
Parker and Carter
ATTORNEYS.

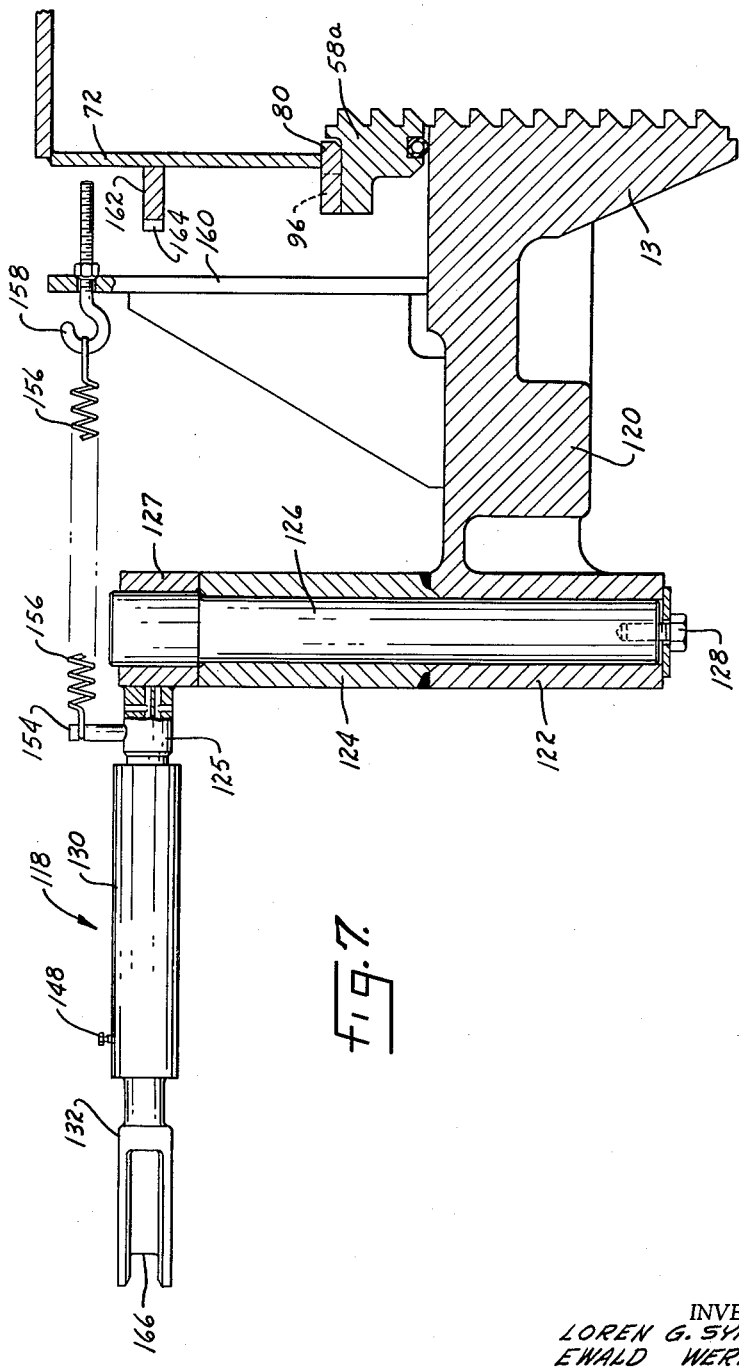

United States Patent Office 3,009,660
Patented Nov. 21, 1961

3,009,660
RELEASE AND ADJUSTMENT FOR
GYRATORY CRUSHERS
Loren G. Symons, North Hollywood, Calif., and Ewald Werner, Milwaukee, Wis., assignors to Nordberg Manufacturing Company, Milwaukee, Wis., a corporation of Wisconsin
Filed Sept. 8, 1958, Ser. No. 759,545
25 Claims. (Cl. 241—290)

The present invention is in the field of crushers, primarily of the gyratory type, although many of the aspects are not necessarily limited specifically thereto. In the specific disclosure herein it relates to an improvement in cone crusher adjusting and release means.

It has for one purpose to provide improved and quickly releasable and yieldable holding means for holding the bowl of a cone crusher against unintended movement in relation to the crusher frame or to a bowl supporting ring or assembly.

Another purpose is to provide means for permitting quick adjustment of the bowl and of a bowl supporting ring or assembly.

Another purpose is to provide improved means for adjusting the bowl of a cone crusher in circumstances where the bowl is in screw-threaded relation to a bowl support by releasing or loosening the screw-threaded contact between bowl and bowl support, and by rotating the bowl in relation to the support after the bowl is loosened.

Another purpose is to provide improved releasing means for moving the bowl of a cone crusher when uncrushable material is present in or wedged between the bowl and head.

Another purpose is to provide improved control means for controlling the bowl locking, the bowl adjusting, and the bowl releasing means.

Another purpose is to provide means for applying hydraulic pressure to release the bowl of such a crusher and for removing or terminating hydraulic pressure to lock the bowl of such a crusher in place.

A primary purpose is to provide a simple mechanism for quickly releasing the crushing pressure between the crushing members, for example, of a gyratory crusher, to remove or permit the removal of material compressed or wedged between the two members.

Another purpose is to provide a quick and simple means for releasing, resetting, or adjusting, and relocking or reclamping an adjustable crushing member.

Other purposes will appear from time to time in the course of the specification and claims.

The invention is illustrated more or less diagrammatically in the accompanying drawings wherein:

FIGURE 1 is a plan view of a crusher of this invention;

FIGURE 2 is a section, on an enlarged scale, along line 2—2 of FIGURE 1;

FIGURE 7 is a portion of the adjusting ram, shown in plan in FIGURE 1, on an enlarged scale and partly in section;

FIGURE 8 is an enlarged view of the ram shown in FIGURE 7, partly in section;

The structure and operation of the device are discussed below in detail. The following points should be kept in mind in relation to gyratory crushers or cone crushers of the type herein described and shown.

In such crushers it is important to quickly adjust the clearance or spacing between the removable head mantles and bowl liners which are customarily used. As these parts wear down in normal use the spacing between them should be kept as near constant as possible, so that the degree of reduction will be approximately uniform over the life of the wearing parts. In crushing very hard materials, such as taconite, very frequent adjustment may become necessary. In the past, this has involved somewhat complicated mechanisms and time-consuming adjustments. Since such crushers are in the line of flow of materials passing through a sequence of machines, the delay in adjusting a cone crusher may result in tying up a whole line of coarser crushers, fine grinders, screens, and conveying equipment. The present invention permits almost instantaneous adjustment.

Also, the presence of tramp iron or other non-crushable material in the crushing zone between head and bowl may stall a crusher. A simple and reliable and quick release for such uncrushable material has long been sought, so that the machine may be quickly cleared and crushing resumed.

The invention is illustrated in connection with a crusher which normally includes a tilting or adjusting ring and which has an annular bowl in screw-threaded relation with the ring. Thus the crushing cavity may be adjusted by rotating the bowl and by thereby moving the bowl and its bowl liner in relation to the head and its mantle. During crushing operation the bowl is normally fixed and the opposed threads of bowl and adjusting ring are firmly locked together.

Figure 3:
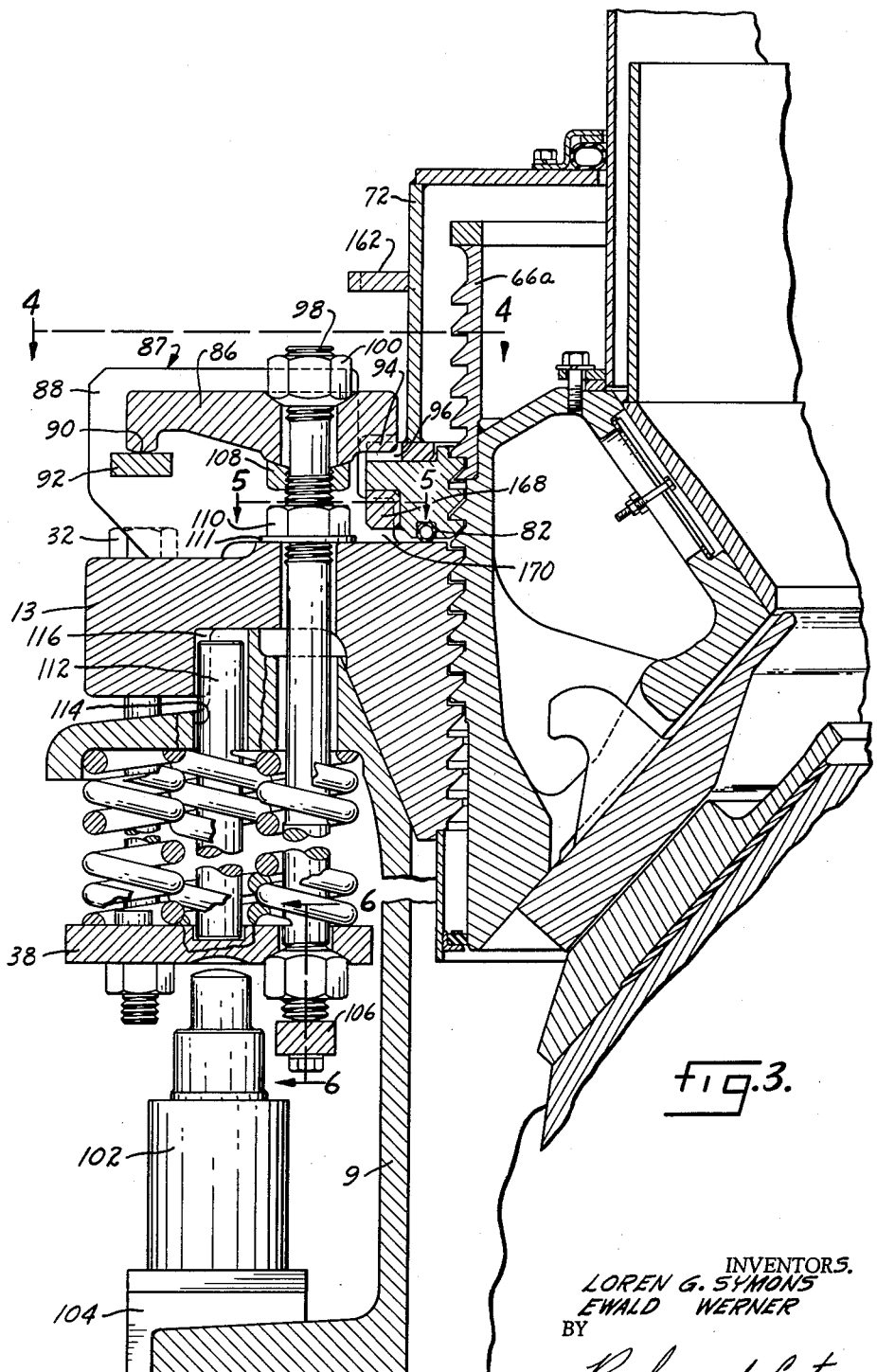
FIGURE 3 is a section, on the FIGURE 2 scale, along line 3—3 of FIGURE 1.

In FIGURES 1 to 3, inclusive, a crusher is shown which includes an outer circumferential main frame 9 with an outwardly extending top flange 9a which supports the adjustment or tilting ring 13 with its inner screw threads 13a. The ring 13 is normally held fixed in relation to the main frame 9 by the below described spring structure. A bowl 18 with its threads 19 is in screw-threaded relation with the threads 13a of the ring 13. The ring is held against rotation in relation to the main frame 9, but the bowl 18 may be adjusted in the adjustment ring, under proper conditions, by rotating the bowl.

A crushing head 24, with its removable, wearable mantle 26, is suitably gyrated within the bowl 18. The actual crushing cavity is the space between the head mantle 26 and the removable, wearable bowl liner 23. Material to be crushed is suitably fed into the space between the wearing members 23 and 26, for example, through the hopper 28, and, after it has passed through the crushing space formed thereby, is suitably disposed of.

The adjustment ring 13 is normally held against the flange 9a of the frame 9 by a spring release, which will be explained in detail hereinafter, the springs being of sufficient force to hold the ring 13 normally firmly against the main frame top flange 9a. When uncrushable material passes through the crushing cavity the below described springs are compressed and the ring 13 may tilt or be raised from the flange 9a.

Figure 4:
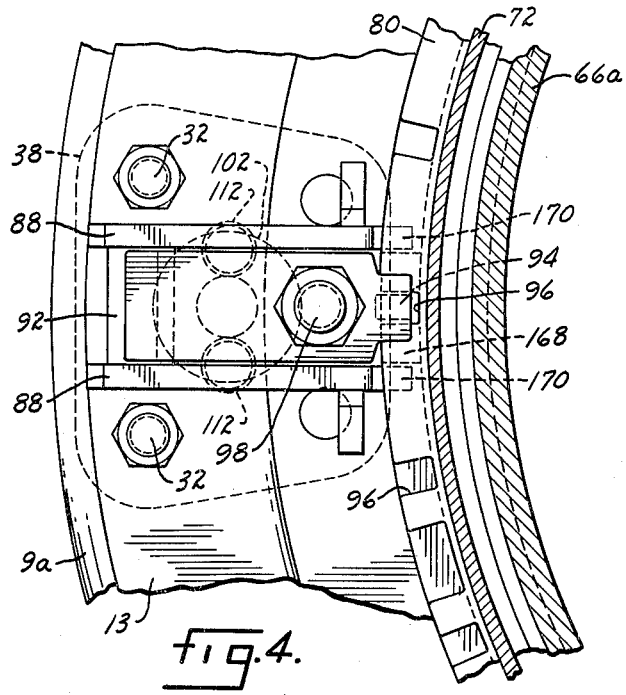
FIGURE 4 is a section along line 4—4 of FIGURE 3.

As shown in FIGURE 1, the springs are arranged in clusters designated generally 29. Each such cluster is shown with eight springs but it might be more or less. As shown, the eight springs in each cluster are arranged in a conventional pattern with three in the inner row, two in the middle row, and three in the outer row, each row being described generally about the vertical axis of the crusher. In FIGURE 1, only the outline or general location of the springs has been indicated and, as shown, each spring cluster would be defined generally by bolt heads and push rods, two bolt heads being shown locating the outside springs in the outer row with the center spring in the outer row being outlined by broken lines. The inner row has the center spring shown by a bolt head and the outside springs by circles. In FIGURE 4, a close-up plan view of a cluster is shown. The two springs in the intermediate row would normally be around push rods 112. Since this general arrangement of springs is old and well known, it will not be referred to in detail, but reference is made to U.S. Patent No. 2,358,038. The invention is not limited to having the clusters arranged in this manner nor is it limited to having the springs in clusters, for that matter, but for purposes of illustration, it will be so described. The clusters may be assumed to be identical, or substantially so, except as noted hereinafter.

As shown in FIGURES 1, 2 and 3, a normal cluster may have spring bolts 32 for the two outside springs in the outer row with the center spring in the outer row positioned by suitable pilots 34. The three springs in the inner row may have one spring bolt 36, preferably for the center spring, with suitable pilots for the outside springs. The three spring bolts pass through a suitable plate 38 or the like and are held by suitable nuts so that a predetermined pressure will hold the tilting ring on the frame. The two springs in the center row may be held by suitable pilots, or spring bolts may be provided, if desired; but it is preferred that only three spring bolts be provided so that a proper balance may be established. In structures of the present invention means are provided whereby the operator can himself control the above described spring release structure for releasing the locking connection between the opposed threads 13a and 19, or for releasing uncrushable material from the crushing space.

As will be noted in FIGURE 1, a plurality of what is referred to as thrust mechanisms 40 are provided. In FIGURE 1 four are shown, suitably spaced about the frame, but any number may be used, and the spacing or arrangement is not critical. These thrust mechanisms may be the same so only one will be described. Each may be associated with one of the spring clusters and, as shown in FIGURE 2, may include a rocker arm or actuating lever 42 on the adjustment ring above a spring cluster. The rocker arm may have one or more outwardly extending ears 44 which are pulled down by bolts 46, which may be the spring bolts in the outer row of springs of the cluster. The bolts 46 extend down through the outer springs in the cluster, through the plate 38 and are provided with suitable nuts 49 and 49a at each end. The rocker arm 42 is suitably fulcrumed at 54a on the adjustment ring and is provided with an inner nose portion 56a that fits under the edge of a locking ring 58a. The center of the rocker arm may be provided with a suitable opening 59 so that it may straddle the head of the spring bolt 36 in the inner row of the spring cluster. A suitable nut 62a may be provided on each of the outer bolts 46 which bears against a washer 64a or the like on the tilting ring during assembly. The upper nut 49 should be tightened so that the nut 62a is slightly out of contact with the washer 64a during normal operation.

The thrust mechanisms 40, as a group, apply an upward thrust which tends to lift or thrust the locking ring 58a upwardly. In effect, a predetermined amount of thrust, established by the springs, will be applied to the locking ring.

The locking ring is threaded at 65a on its inner surface and fits the threads on the bowl, as shown in FIGURE 2. In FIGURE 2, for example, the bowl 18 is shown as provided with an upward extension or portion 66a which may be welded at 66b or formed integral with the bowl, and which functions as an upward continuation of the bowl.

An upper housing or deflector 68a may be suitably mounted on the bowl at 70 and an adjustment cap or torsional thrust ring 72, supported on the locking ring, may have a suitable seal 74 to prevent the entrance of foreign matter between the cap and the upper housing. The cap 72 may be provided with one or more suitable inwardly disposed ribs 76 which fit in notches 78 in the bowl extension 66a. Thus the bowl extension and adjustment cap are rotatively interlocked or keyed but they may be moved vertically relative to each other. When the cap 72 is rotated, its keyed connection 76—78 will cause the bowl extension and, therefore, the bowl to rotate. Such rotation will cause the bowl to screw either up or down in the tilting ring.

The lower edge of the adjustment cap 72 is provided with a suitable flange or ring 80 which may reset on the locking ring 58a so that it may rotate thereon.

To prevent the entrance of dirt and dust in the threads, a suitable seal 82 may be provided on the bottom of the locking ring. This seal, shown in this case as an O-ring, is constructed so that separation of the locking and tilting rings may take place without losing the sealing effect. When the thrust units 40 are released in a manner to be set forth hereinafter, the locking ring 58a may engage the adjustment ring, and the seal will be compressed. But when the locking ring is thrust upwardly by the thrust units 40, the locking ring will be raised somewhat, and the O-ring seal should expand sufficiently to maintain the seal.

The upward thrust of the units 40 may lift the locking ring and this, in turn, may lift the bowl. There will be a slight amount of clearance between the threads of the bowl and the threads of the adjustment ring. The upward thrust applied to the bowl will lift it sufficiently so that the tops of the threads on the bowl will be in firm contact with the bottoms of the threads on the adjustment ring. This condition is shown in FIGURE 2, and the clearance between the threads will be on the bottom where it will have no effect during crushing. In short, impacts from the crushing action will be transmitted directly to the adjustment ring, and any vibration or wear due to play or clearance in the threads will be completely eliminated.

Rotation of the bowl will cause it either to be raised or lowered in the adjustment ring. One or more locking units 84 may be provided to positively but releasably lock the bowl in any adjusted position. When the mantle 26 and the liner 23 have been somewhat worn the bowl should be lowered and rotation thereof in one direction will lower it. When the worn mantle and liner have been replaced with new ones, the bowl should be raised, and rotation in the opposite direction will do this. In any adjusted position the bowl should be locked so that unintended movement may not take place. Two locking or clamping units 84 are shown in FIGURE 1, 180° apart, but more or fewer may be used. Each locking unit is disposed over a spring cluster, as shown in FIGURE 1, and is associated with that cluster. Each unit may include a clamp bar or locking lever 86 in FIGURE 3 mounted in a box 87 which may include upstanding side plates 88 suitably welded or otherwise mounted on the tilting ring 13. The clamp bar is constructed to pivot on its outer end 90 on a suitable cross member 92 mounted between the side plates 88. The inner end or nose 94 of the bar fits into one of a plurality of notches 96 in the ring or flange 80, shown in FIGURE 4, which is a part of the adjustment cap 72. A spring bolt 98 in the center spring of the inner row extends up through the clamp bar and, by a suitable nut 100, is adapted to pull the bar down so that the nose 94 will fit in one of the notches 96 in the adjustment cap.

Figure 6:
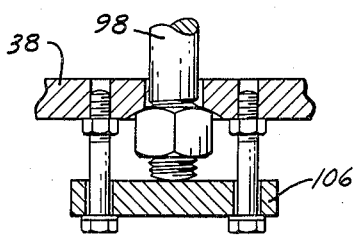
FIGURE 6 is a section along line 6—6 of FIGURE 3.

A plurality of hydraulic jacks 102 or the like are shown as mounted on suitable platforms 104 which may be formed as an integral part of or as a separate attachment to the main frame. The jacks, indicated in broken lines in FIGURE 1, may be disposed in pairs, four such pairs being shown spaced approximately 90° apart in FIGURE 1. But this arrangement is merely a matter of convenience and they may be disposed otherwise. As shown in FIGURES 2 and 3, each jack is below a spring cluster and, upon actuation, applies an upward thrust to the cluster. In FIGURE 1 jacks have been disposed under all of the thrust mechanisms and clamp units as well as under two other clusters, making a total of eight, but more or less might be used. Each jack engages the plate 38 of a cluster. The jacks under the clamp units raise the inner spring bolts 98 due to the bracket 106, as shown in FIGURES 3 and 6. A nut 108 on the bolt below the clamp bar will lift or pivot the clamp bar about its outer end so that the nose 94 will be picked up out of the notch in the adjustment cap. The nuts 100 and 108 are shown with spherical seats which match spherical formations on the clamp bar. A suitable nut 110 or the like may be provided on the bolt to engage a washer 111 on the adjustment ring during assembly. The upper nut 100 should be turned down sufficiently so that the nut 110 will be raised slightly off of the washer 111.

Total movement of the clamp bar nose between its raised or released position and its lowered position, where the sides of the nose engage the flange 80, may be on the order of a fraction of an inch or so. When the ring 13 tilts, due to tramp iron in the crushing cavity, the spherical seats between the nuts 100 and 108 and the clamp bar will allow the spring bolt 98 to pivot slightly about the clamp bar. When the jacks under the clamp units are actuated the clamp bars will be raised and the adjustment cap 72 will be free for rotation. Thereafter, the cap may be rotated by a ram mechanism, to be set forth in detail hereinafter, and this will rotate the bowl 18.

As noted in FIGURE 1, jacks also are located under the thrust units 40. Operation of these jacks compresses the spring cluster and relieves the downward pull on the rocker arms 42. Thus, the upward thrust applied to the locking ring 58a will be relieved.

It should be understood that all of the jacks 102 may be operated together, and the upward thrust applied under the clamp units and thrust mechanisms to relieve them may occur simultaneously.

Certain of the spring clusters are provided with push rods 112, shown in FIGURES 1, 2 and 3, which may be disposed in the two springs in the middle row of the spring clusters. Two such push rods are disposed in each of the spring clusters which have jacks 102 located below them. Note, in FIGURE 1, that two such push rods 112 are shown in broken lines on top of the broken line representation of each of the jacks 102. As shown in FIGURE 3, each push rod 112 may rest on the plate 38 and extend up through a suitable passage 114 in the main frame flange terminating just below the tilting ring. A certain spacing 116 is provided normally between the upper end of the push rod and the tilting ring 14.

Upon actuation of the jacks 102, the spring clusters will be compressed, the push rods 112 will be raised until they contact the adjustment ring 13, the clamp units 84 will release the adjustment cap and bowl, and the upward thrust applied to the locking ring 58a by the thrust units 40 will be relieved. The clearance 116 between the top of the push rods and the adjustment ring 14 should be such that the clamp bars will release the adjustment cap and upward thrust will be relieved from the locking ring before the push rods engage the adjustment ring.

The jacks may have a suitable control arrangement, set forth more in detail hereinafter, so that two positions of adjustment or excursion may be acquired. Or it may be carried out manually or by sight observation of a pressure gauge. But, be that as it may, the jacks are adapted to extend so that they compress the spring clusters and raise the push rods until they just contact the adjustment ring 13, and they may be further extended so that the adjustment ring will be lifted off of the main frame, thereby further compressing the springs in the clusters, possibly until the springs are compressed solid.

It will be noted that in the first or lesser position of jack excursion when the push rods just engage but do not lift the adjustment ring 13, the clamp units will have released the bowl so that it may be rotated to raise or lower it in the adjustment ring. Also, the upward thrust applied to the locking ring 58a will be relieved so that the bowl may be easily turned. In the second position of excursion of the jacks, the more extended position, the adjustment ring will be lifted, but the clamp and thrust units will remain released.

To rotate or adjust the bowl, hydraulic rams or the like are provided. Only one ram is shown in FIGURE 1 and is designated 118, but another ram mounting is shown at 119. Thus, in FIGURE 1, two rams would be used, but it should be understood that more or less might be used. But since the rams could be identical, only one ram, as at 118, has been shown and explained in detail. Two are preferred to counteract or balance any side thrusts. As shown in FIGURE 7 each ram may be mounted on an outwardly extending boss 120 which may be formed as an integral part of the adjustment ring 13. The sleeve 122 has an upward extension 124. A headed pin 126 may be held in the sleeve formation by a suitable screw 128 or the like and the ram unit 118 may be pivoted on the head of this pin.

The ram in detail, as best shown in FIGURE 8, may include a main rod 125 welded or otherwise secured to a ring 127 around the head of the pin. The rod carries an outer sleeve or housing 130 and a projecting arm 132. Passages 134 and 136 are drilled or otherwise formed through the main rod with suitable connections 138 and 140 for hydraulic fluid or the like. The passages 134 and 136 open on opposite sides of a piston 142 which has a sliding sealed fit with the inside of the sleeve 130. It will be noted that there is clearance between the outside of main rod 125 and the inside of the sleeve 130. A sleeve seal 144, held in place by a suitable snap ring 146 or the like, closes the inner end of this clearance space.

The arm 132 is adjustably held in place by a set screw 148 or the like. A hub portion 150 closes the front end and a seal is effected on an inner portion 152.

When fluid is admitted to the channel 134 through the connection 138, the sleeve 130 and arm 132 will be forced outwardly. When the unit is in its extended position and fluid is admitted through the other channel 136 by the connection 140, a pressure will be applied to the sealing piston 144 which will draw the sleeve 130 back. Thus the ram mechanism may be made to reciprocate by admitting high pressure fluid alternately to the connections 138 and 140.

The rod 125 is provided with an upstanding stud or finger 154. A spring 156 is connected to this finger and to a suitable hook 158 or the like mounted on an upstanding plate 160 which, in turn, is secured by welding or otherwise on the adjustment ring. The hook 158 is disposed on a radial line running through the pivot of the ram and the axis of the crusher. Thus the ram may be pivoted over center, either right or left in FIGURE 1, depending upon which way it should operate.

A camming ring 162, having suitable notches or teeth, such as at 164 in FIGURE 1, is suitably connected by welding or otherwise to the adjustment cap 72. Note in FIGURE 7 that this camming ring is directly opposite the ram 118. The result of this is that the spring 156 will pull the ram in on either side until a flanged nose portion 166 on the arm 132 engages the ring 162. The nose has upper and lower flanges which will lie both above and below the ring 162. When the ram is operated, the center portion of the nose will engage the lugs or teeth 164 and, in a step by step manner, the ring will be rotated. Rotation of the ring rotates the adjustment cap 72 which, through the key connection 76—78, rotates the bowl, thus effecting adjustment by turning the bowl either up or down. The length of the ram stroke, the spacing of the teeth 164 on the ring, and the angular disposition of the ram are such that the nose of the ram will come out of contact with one tooth on the ring when the next tooth has moved up to where it will be engaged by the fully withdrawn ram. The amount of rotation of the bowl will be automatically established for each excursion or step of the ram. Also, the stroke is such that one of the notches in the adjustment cap flange 80 always stops under the nose of the clamp bar. If misalignment takes place the arm 132 on the ram may be shortened or lengthened by relative rotation of the cylinder 130 and the threaded member 150, to change its effective stroke, and can be locked in adjusted position by the set screw 148. It will be noted, also, that when the ram is withdrawn, the nose will drag back along the ring 162 to the next tooth since the spring 156 will keep it in contact with the ring at all times. One of the big advantages of this type of ram mechanism is that it may be moved over center quickly so that the bowl may be turned either up or down without undue complication.

Figure 5:
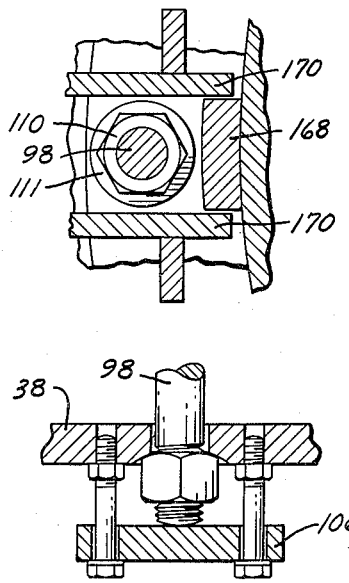
FIGURE 5 is a section along line 5—5 of FIGURE 3.

When the ram rotates the bowl, as set forth hereinabove, the locking ring 58a will have a tendency to rotate with it, but this is prevented, for example, by a block 168, shown in FIGURES 3, 4 and 5, welded or otherwise formed on the ring and disposed between projecting ears 170 on the side plates 88 of the box. These blocks hold the locking ring in relation to the adjustment ring so that when the bowl is rotated by the rams, the locking ring will stay in position relative to the adjustment ring and will not rotate. Two such blocks or keys may be used, one on each clamp mechanism, if desired.

Figure 9:
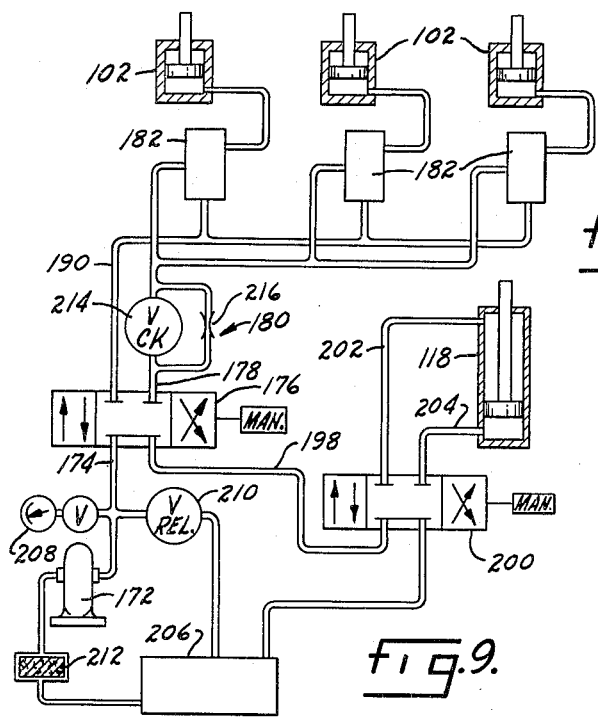
FIGURE 9 is an hydraulic circuit.
Figure 10:
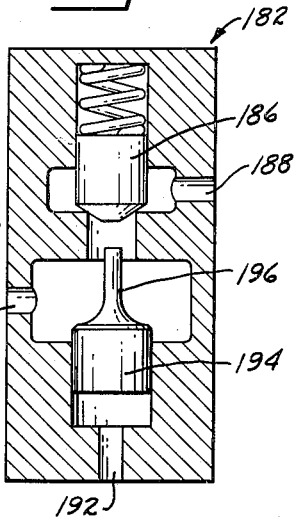
FIGURE 10 is a section of a valve used in FIGURE 9.

An available hydraulic circuit for operating the rams and the jacks is shown in FIGURE 9 where a suitable pump 172 supplies hydraulic fluid under pressure through a line 174 to a main valve 176. A line 178 from the main valve supplies the fluid through a one-way orifice or throttling restriction 180 to a plurality of safety valves 182, each of which is connected to a jack 102. The inlet 184 to each of the safety valves from the supply line 178, as shown in detail in FIGURE 10, passes upwardly through a check valve 186 and then through a discharge 188 to the jacks. The check valve may be any suitable spring-biased plunger or the like.

If all of the jacks were extended and a hydraulic failure occurred, the springs of the various clusters would slam the bowl down on the main frame with considerable force, resulting in possible damage to the equipment and injury to personnel. To prevent this the check valves 186 will trap fluid in the jacks and will hold the bowl in a raised or elevated or fully extended position if such a failure takes place.

To lower the jacks, an alternate or second line 190 leads from the main valve 176 and is connected through an inlet 192 to the safety valve. When the valve 176, which may be manually operated, is adjusted so that the fluid under pressure is supplied through the second line 190, a piston 194 in the safety valve will be forced up. This piston is provided with an extended nose 196 which raises the check valve 186. This allows the fluid to flow out of the jacks on a controlled basis back through the inlet 184 and the line 178.

The main valve 176 also controls a line 198 which leads to a similar valve 200 to supply the fluid under pressure through lines 202 and 204 to opposite sides of the piston in the ram 118. Both valves 176 and 200 may be manually operated. In FIGURE 9 the jacks and ram have only schematically been shown to avoid a repetition of detail. The hydraulic circuit may be provided with a suitable supply sump 206, a pressure gauge 208, a relief valve 210, a filter 212 in the supply line to the pump, and various other conventional auxiliary equipment. The restriction may have a check valve 214 in parallel with an orifice 216 to provide full flow in one direction and reduced flow in the other.

The use and operation of the invention are as follows:

In any adjusted position, the bowl, by the above described spring release structure, is firmly held against rotation in relation to the adjusting ring 13. The threads are also locked together against relative axial movement. The powerful springs hold the adjusting ring 13 firmly against the main frame top flange 9a and thus hold the bowl 18 and its liner 23 against undesired movement away from the head. However, when tramp iron or other uncrushable material enters the crushing cavity the springs will give and permit upward tilting of the adjusting ring 13, and thus of the bowl 18, in relation to the main frame.

The above described hydraulic system does not interfere with or normally interrupt the above described spring release. It performs, however, three vitally important functions.

An initial upward movement of the jacks contacts the spring ring assembly and releases the normal locking compression of the threads 13a and 19. It also releases the above described supplemental locking devices, and puts the bowl in condition for rotary adjustment in relation to the adjusting ring. If the purpose of the operator is adjustment, he then employs the thrusting rams, shown in FIGURE 1, and in detail in FIGURES 7 and 8, to rotate the bowl in relation to the adjustment ring 13. When the desired movement or rotation is completed, then the hydraulic system is returned to its normally non-operating position. When so returned it returns the parts to locked relationship, with the bowl 18 yieldingly held against movement in relation to the main frame 9, at the new position of adjustment of the bowl.

In addition to the release for adjustment, and return to initial position, the hydraulic system may be employed, by a greater upward movement, as a quick means for releasing crushing pressure by lifting the bowl upwardly, from the main frame, so that the uncrushable articles or material between bowl and head may escape or may be quickly removed. After such release movement the hydraulic system is returned to its initial position, with the bowl yieldingly held against movement in relation to the main frame.

Two rams, disposed 180° apart, are preferred so that their radial components will be counterbalanced, but a greater or less number might be used. The rams may be set to automatically bring the camming ring to a position on each stop, so that the nose of the clamp bar, when lowered, will enter one of the notches.

The operator, of course, can readily and instantaneously so control the hydraulic system as to obtain either the relatively small upward spring compression necessary for release and adjustment operation or the relatively large movement necessary in freeing tramp iron and the like from the crushing cavity.

The safety set up in the hydraulic circuit has the advantage that, otherwise, if a failure occurred in the hydraulic system when the crusher was at full release, the force of the springs would bring the bowl down so rapidly and with such thrust that personnel might be injured and the machine itself might be severely damaged. The simplicity of the arrangement is of decided importance since the tramp release, bowl release and accurate adjustment are all provided with one hydraulic circuit without undue complications.

Whereas the preferred form of the invention has been shown and several modifications have been suggested, it should be understood that numerous additional modifications, changes, substitutions and alterations may be made without departing from the fundamental frame of the invention. With these and other modifications in mind, it is desired that the invention be unrestricted, except as by the appended claims. The jacks and rams may be added to an existing machine or included in original equipment. It is advantageous to provide a relatively rapid return stroke for the ram. Such a rapid return stroke, in contrast to a relatively slow forward stroke, is inherent in the particular ram structure herein shown. With reference, for example, to FIGURE 8, the inside area of the cylinder 130 determines the power stroke velocity, and the area between the cylinder and the piston 125 determines the return velocity. It is clear that, with a given amount of fluid under a given pressure, the power stroke will be slow and powerful and the return stroke fast and less powerful. Thus, the forward stroke, where power is the primary necessity, is slow and powerful, whereas the back stroke, where power is less important and speed is more important, is more rapid.

We claim:

1. In a crusher having a main frame and an adjustable bowl, and a movable head which forms a crushing cavity with the adjustable bowl, an adjustment ring mounted on the main frame, a screw-threaded connection between the bowl and the adjustment ring whereby, in response to rotation of the bowl in relation to the adjustment ring, the bowl may be adjusted toward and away from the head, yielding means for securing the adjustment ring, and thus the bowl, against axial movement under normal crushing operation, means for applying fluid pressure to overcome the yielding means for releasing the bowl, and for removing the pressure to return the bowl to normal secured condition, and means for positively locking the bowl against rotation effective when the bowl is in normal secured condition.

2. The structure of claim 1, characterized in that the positive securing means include a torsional thrust ring keyed to the bowl to allow relative vertical movement but causing the thrust ring and bowl to rotate together, and means for positively locking the torsional ring against rotation when the bowl is in normal secured condition so that the bowl cannot rotate.

3. The structure of claim 2, characterized by and including a hydraulic ram operable against the torsional thrust ring, and means for actuating said ram and for thereby imparting rotation to the thrust ring and to the bowl, said ram being mounted in opposition to the thrust ring alternatively to rotate said ring in opposite directions of rotation.

4. In a crusher having a main frame and an adjustable bowl and a movable head which forms a crushing cavity with the adjustable bowl, a screw-threaded adjusting connection intermediate the bowl and the main frame whereby, in response to rotation of the bowl about the axis of the crusher, the bowl may be adjusted toward and away from the head, yielding means for securing the bowl against axial movement under normal crushing operation, means for applying fluid pressure to overcome the yielding means for releasing the bowl, and for removing the pressure to return the bowl to normal secured condition, and means for positively locking the bowl against rotation, said means being effective when the bowl is in normal secured condition in relation to the main frame.

5. The structure of claim 4, characterized in that the positive securing means include a torsional thrust ring keyed to the bowl to allow relative vertical movement but causing the thrust ring and bowl to rotate together, and means for positively locking the torsional ring against rotation when the bowl is in normal secured condition so that the bowl cannot rotate.

6. In a crusher having a main frame and an adjustable bowl and a movable head which forms a crushing cavity with the adjustable bowl, an adjustment ring mounted on the main frame, a screw-threaded connection between the bowl and the adjustment ring whereby, in response to rotation of the bowl in relation to the adjustment ring, the bowl may be adjusted toward and away from the head, yielding means for securing the adjustment ring, and thus the bowl, against axial movement under normal crushing operation, means for applying fluid pressure to overcome the yielding means for releasing the bowl, and for removing the pressure to return the bowl to normal secured condition, and fluid operated means for rotating the bowl in relation to the adjustment ring, in a sequence of predetermined uniform excursions, and for thereby adjusting the bowl in relation to the movable head.

7. The structure of claim 6, characterized by and including locking means effective at the end of adjustment, when pressure has been removed to return the bowl to normal secured condition, said locking means operate positively to prevent bowl rotation.

8. The structure of claim 6, characterized by and including spring means for normally forcing the opposed screw-threaded portions of the bowl and adjustment ring into firm contact and locking means formed and adapted normally positively to prevent bowl rotation, and means for rendering both said spring and locking means temporarily inoperative when fluid pressure is applied to release the bowl for adjustment.

9. The structure of claim 6, characterized by and including a torsional thrust ring held against rotation in relation to the bowl by means permitting relative axial movement of bowl and thrust ring and means for applying force to said thrust ring and for thereby rotating the bowl in relation to the adjustment ring, said thrust ring having a plurality of projections arranged circumferentially about its exterior, means for applying a thrust against said projections, and for thereby rotating the bowl, and means effective, when fluid pressure has been removed to return the bowl to normal secured condition, to interlock with said projections, whereby positively to hold the bowl against unintended adjusting rotation.

10. In a crusher having a main frame and an adjustable bowl and a movable head which forms a crushing cavity with the adjustable bowl, an adjustment ring mounted on the main frame, a screw-threaded connection between the bowl and the adjustment ring whereby, in response to rotation of the bowl in relation to the adjustment ring, the bowl may be adjusted toward and away from the head, yielding means for securing the adjustment ring, and thus the bowl, against axial movement under normal crushing operation, means for applying fluid pressure to overcome the yielding means for releasing the bowl, and for removing the pressure to return the bowl to normal secured condition, and means for rotation of the bowl in relation to the adjustment ring, including a torsional thrust ring held against rotation in relation to the bowl by means permitting relative axial movement of bowl and thrust ring, means for applying force to the thrust ring for thereby rotating the bowl in relation to the adjustment ring, and means effective when the bowl is in normal secured condition to prevent rotation of said thrust ring.

11. In a crusher having a main frame and an adjustable bowl and a movable head which forms a crushing cavity with the bowl, an adjustment ring mounted on the main frame, a screw-threaded connection between the bowl and the adjustment ring whereby, in response to rotation of the bowl in relation to the adjustment ring the bowl may be adjusted toward and away from the head, a locking ring in screw-threaded relation with the bowl and held against rotation in relation to the adjustment ring, yielding means for securing the adjustment ring and thus the bowl against axial movement under normal crushing operation, yielding means for normally urging the locking ring to axial movement in relation to the adjustment ring, whereby to urge the bowl into thread clamping relation with the adjustment ring, and means for applying fluid pressure to release the bowl for adjustment, and for removing the pressure, to return the bowl to normal secured condition, including means for positively locking the bowl against unintended adjusting rotation.

12. The structure of claim 11, characterized by and including a torsional thrust ring, means for holding it against rotation in relation to the bowl while permitting relative axial movement of bowl and ring, and means for applying an angular thrust against said torsional ring and for thereby rotating ring and bowl, said means being effective when the bowl is released for adjustment.

13. The structure of claim 11, characterized by and including actuating levers mounted on the adjustment ring and formed to engage the locking ring, and yielding means for normally urging said levers toward locking position when the bowl is in normal secured condition.

14. The structure of claim 12, characterized by and including locking levers mounted on the adjustment ring and means for urging them into locking engagement with the torsional thrust ring when the bowl and adjustment ring are in normal secured condition in relation to the main frame.

15. In a locking and adjusting assembly for a gyratory cone crusher having a main frame, an adjustment ring on the main frame and a bowl in screw-threaded relation with the adjustment ring, a torsional thrust ring, and a key connection for holding the thrust ring against rotation in relation to the bowl while permitting relative axial movement of bowl and thrust ring, said thrust ring forming part of an enclosure surrounding the upper end of the screw-threaded part of the bowl.

16. The structure of claim 15, characterized by and including a locking ring held against rotation in relation to the adjustment ring but movable axially in relation thereto, and means for urging said locking ring axially against the threads of the bowl, said torsional thrust ring being positioned and adapted to rest upon said locking ring at all positions of adjustment of the bowl.

17. In a system of bowl adjustment for a crusher or the like, a main frame, a bowl mounted on the main frame for adjustment relative thereto, a crushing head mounted for movement in the main frame and defining a crushing cavity with the bowl, and means for rotating the bowl relative to the main frame to effect adjustment thereof including at least one fluid operated ram having a piston and cylinder pivoted on the main frame, a torsional thrust ring on the bowl opposite the piston and adapted to be engaged thereby, means for pivotally biasing the ram toward the bowl so that a ram member will engage the thrust ring, and power means for reciprocating such ram member to effect adjustment of the bowl.

18. The structure of claim 17, characterized in that the ram is mounted and movable to rotate the bowl in either direction of rotation.

19. In a system of bowl release for a crusher or the like, a main frame, a bowl mounted on the main frame, a plurality of springs disposed about the main frame for normally holding the bowl in crushing position, a crushing head mounted for movement in the main frame and defining a crushing cavity with the bowl, a power system for compressing the springs and raising the bowl to release position, including a plurality of hydraulic jacks arranged about the main frame, a hydraulic circuit for supplying high pressure fluid to the jacks, a source for supplying high pressure fluid connected to the circuit, a check valve in the circuit to prevent the bowl from returning rapidly from release position to crushing position in the event of a failure in the power system when the bowl is in release position, and a second circuit for releasing the check valve to allow the bowl to return from release to crushing position under control of the operator.

20. In a system of bowl adjustment for a crusher or the like, a main frame, a bowl mounted on the main frame for rotary adjustment relative thereto, a crushing head mounted for movement in the main frame and defining a crushing cavity with the bowl, and means for rotating the bowl relative to the main frame to effect adjustment thereof, including at least two fluid operated rams, a torsional thrust ring on the bowl opposite the rams and adapted to be engaged thereby, the rams being disposed about the crusher equidistant from one another so that lateral thrust against the bowl from the rams, as a group, will be counterbalanced.

21. In a system of bowl release for a crusher or the like, a main frame, a bowl mounted on the main frame, a plurality of springs disposed about the main frame for normally holding the bowl in crushing position, a crushing head mounted for movement in the main frame and defining a crushing cavity with the bowl, a power system for raising the bowl to release position compressing the springs, including a plurality of hydraulic jacks arranged about the main frame, a hydraulic circuit for supplying high pressure fluid to the jacks, a source for supplying fluid to the circuit, a check valve in the circuit to prevent the bowl from returning rapidly from release position to crushing position in the event of a failure in the power system when the bowl is in release position, and manually operable means for releasing the check valve to allow the bowl to return from release to crushing position under manual control of the operator.

22. The structure of claim 21 further characterized in that each jack has a check valve.

23. In a crusher having a main frame and an adjustable bowl, a movable head defining a crushing cavity with the bowl, the bowl being screw threaded in the main frame so that in response to rotation thereof, the bowl will be adjusted either toward or away from the head, yielding means for securing the bowl against axial movement during normal crushing operation and a positive lock for locking the bowl against unintended rotary adjustment, including springs normally biasing the positive lock into effective position to lock the bowl against unintended rotary adjustment, and power means for overcoming the springs and releasing the positive lock.

24. In a system of bowl adjustment for a crusher and the like, a main frame, a bowl mounted on the main frame for rotary adjustment relative thereto, a crushing head mounted for movement in the main frame and defining a crushing cavity with the bowl, and means for rotating the bowl relative to the main frame to effect adjustment thereof, including at least two fluid operated rams adapted to apply a circumferential thrust to the bowl to rotate it relative to the main frame, the rams being disposed about the crusher equidistant from one another so that the radial components of the lateral thrust against the bowl from the rams, as a group, will be counterbalanced.

25. In a system of bowl adjustment for a crusher and the like, a main frame, a bowl mounted on the main frame for rotary adjustment relative thereto, a crushing head mounted for movement in the main frame and defining a crushing cavity with the bowl, and means for rotating the bowl relative to the main frame to effect adjustment thereof, including at least one fluid operated ram adapted to engage the bowl and mounted for pivotal movement on the main frame about a vertical axis so that the ram may be moved to rotate the bowl in either direction, and resilient means for applying a generally radial inward bias to the ram, in either position, so that it will be biased against the bowl in either position.

References Cited in the file of this patent

UNITED STATES PATENTS

| | | |
|---|---|---|
| 783,262 | Gransac | Feb. 21, 1905 |
| 2,310,737 | Gruender | Feb. 9, 1943 |
| 2,358,038 | Symons | Sept. 12, 1944 |
| 2,618,121 | Tucker | Nov. 18, 1952 |
| 2,687,257 | Rumpel | Aug. 24, 1954 |
| 2,747,804 | Rumpel | May 29, 1956 |
| 2,787,425 | Gruender | Apr. 2, 1957 |